I. B. KEMPSHALL.
AUTOMOBILE TIRE.
APPLICATION FILED JULY 22, 1909.
943,025.  Patented Dec. 14, 1909.
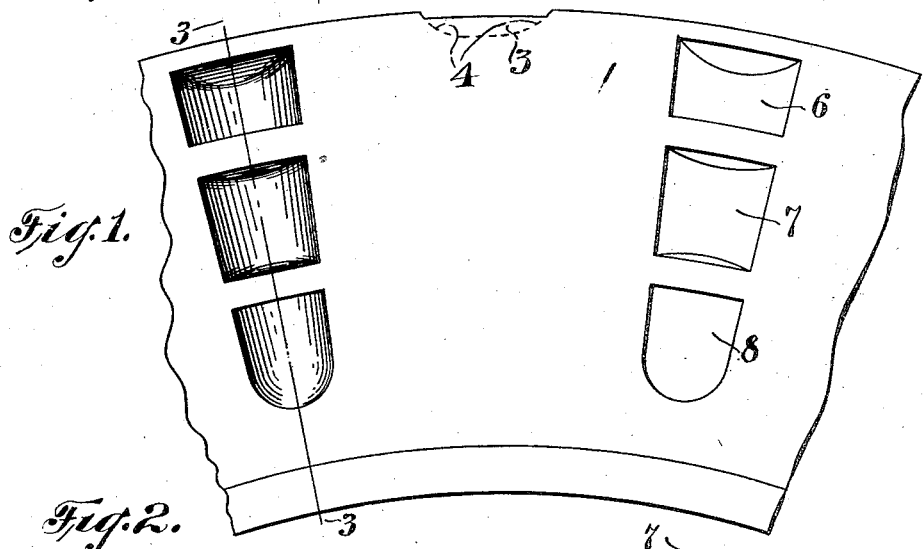
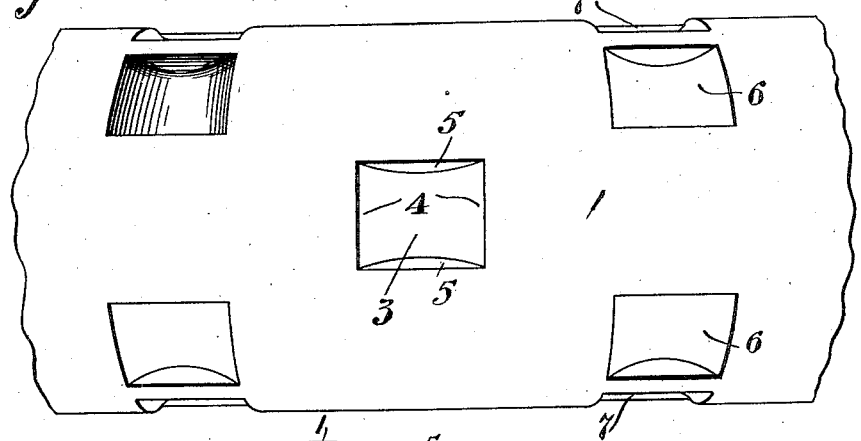
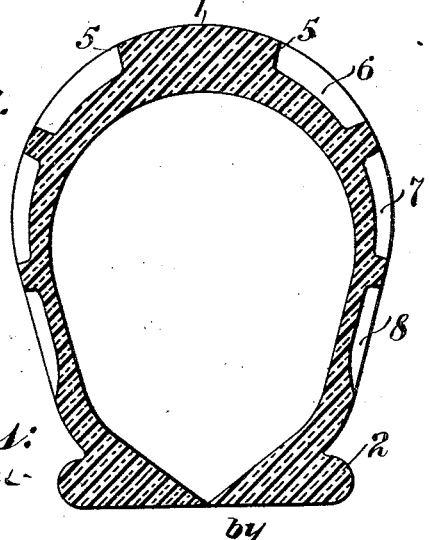
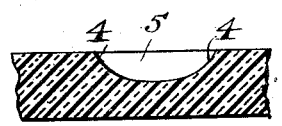
Witnesses:
H. L. Robbins
P. W. Pezzetti
Inventor:
Iva B. Kempshall,
Wright Brown Quinby & May
Attys.

UNITED STATES PATENT OFFICE.

IVA BELLE KEMPSHALL, OF BOSTON, MASSACHUSETTS.

AUTOMOBILE-TIRE.

943,025.

Specification of Letters Patent.

Patented Dec. 14, 1909.

Application filed July 22, 1909. Serial No. 508,960.

*To all whom it may concern:*

Be it known that I, IVA BELLE KEMPSHALL, of Boston, in the county of Suffolk and State of Massachusetts, have invented certain new and useful Improvements in Automobile-Tires, of which the following is a specification.

This invention relates to an improvement in automobile tires and consists in the provision of means to prevent skidding of the tire.

Figure 1 is a side elevation of a tire, or wear member of a tire, constructed in accordance with my invention, showing the lateral pockets. Fig. 2 is a top plan view of a tire, showing the arrangement of the lateral pockets with the tread line of pockets. Fig. 3 is a cross-sectional view on line 3—3 of Fig. 1, showing the shape of the cross wall of the pockets. Fig. 4 is a detail longitudinal sectional view through one of the pockets, showing the shape of the walls of the pockets.

The same symbols of reference indicate the same parts in all of the figures.

1 represents a tire, or wear member of a tire, of any preferred construction, the surface of which is composed of rubber. As shown, this member of the tire is adapted to be secured to the wheel by beads, as 2. I have not shown the wheel or the inner tube, as they form no part of my invention and are well known constructions. In the rubber surface of the tire along the tread line I form a series of central pockets 3. Said pockets have end walls 4 which extend crosswise of the tire and are oppositely inclined lengthwise of the tire, or in other words, are oblique to the tread surface in the direction of its length, as shown in Fig. 4. The pockets have side walls 5 which extend lengthwise of the tire and are substantially or approximately radial to the center of the tire. This series of pockets extends around the whole of the tread line of the tire member 1. In the rubber surface of the tire on each side of the tread is formed a series of sets of what I term lateral pockets, each set being composed of three pockets 6, 7, 8, arranged one over the other. There is a set of such lateral pockets 6, 7, 8, on each side of the tread of the tire, opposite each other, and such sets of lateral pockets alternate with, or are staggered with the central pockets 3. Each of the lateral pockets 6, 7, 8, has substantially the same form as the central pockets (see Fig. 4).

In operation, the load upon the tire is sufficient to depress it so that any skidding tendency brings into action one or the other series of lateral pockets, which, by their grip on the road surface, maintain tire contact and prevent skidding. The central pockets also act in the same way to prevent skidding.

The central and lateral pockets not only prevent skidding, as above stated, but also, as tests have shown, their end walls 4 have a fan like action and cause radiation of heat from the tire, and therefore serve to keep the tire cool, and prevent weakening tendency due to heat. Said lateral pocket construction further increases the resiliency of the tire. It will further be seen that the lateral pockets diminish in depth from the tread to the bead 2 of the tire and that the ribs separating the lateral pockets are flush with the general surface of the tire.

While I have shown my invention adapted for use with a wear member of a pneumatic tire, I do not wish to be understood as limiting my invention to a pneumatic tire, as it is equally applicable and intended for use upon all classes of resilient tires, whether solid, pneumatic, cushion, or otherwise.

Having thus explained the nature of my invention and described a way of constructing and using the same, though without attempting to set forth all of the forms in which it may be made, or all of the modes of its use, what I claim and desire to secure by Letters Patent is:—

1. An anti-skidding tire for automobiles provided with a rubber surface formed along the tread with a series of recesses, said surface upon each side of the tread being formed with a lineally arranged series of sets of recesses having substantially radial longitudinal walls and oppositely inclined transverse walls.

2. An anti-skidding tire for automobiles provided with a rubber surface formed upon each side of the tread with a series of lineally arranged sets of cross recesses, said recesses having substantially radial longitudinal walls and oppositely inclined transverse walls.

3. An anti-skidding tire for automobiles provided with a rubber surface formed along its tread with a series of recesses having substantially radial longitudinal walls and oppositely inclined transverse walls, the said surface being formed upon each side of the tread with a lineally arranged series of sets of cross recesses, also having substantially radial longitudinal walls and oppositely inclined transverse walls, the tread recesses being staggered with the cross recesses.

4. An anti-skidding tire for automobiles provided with a rubber surface formed upon each side of the tread with a series of sets of cross recesses which diminish in depth toward the bead of the tire, the longitudinal walls of said recesses being substantially radial.

5. An anti-skidding tire for automobiles provided with a rubber surface formed with a series of recesses having substantially radial walls and oppositely inclined transverse walls.

In testimony whereof I have affixed my signature, in presence of two witnesses.

IVA BELLE KEMPSHALL.

Witnesses:
H. L. ROBBINS,
P. W. PEZZETTI.